US011926024B1

(12) United States Patent
Packer

(10) Patent No.: US 11,926,024 B1
(45) Date of Patent: Mar. 12, 2024

(54) PLUMBING TOOL ASSEMBLY

(71) Applicant: David Packer, Topeka, KS (US)

(72) Inventor: David Packer, Topeka, KS (US)

( * ) Notice: Subject to any disclaimer, the term of this patent is extended or adjusted under 35 U.S.C. 154(b) by 0 days.

(21) Appl. No.: 18/110,179

(22) Filed: Feb. 15, 2023

(51) Int. Cl.
*B25B 27/00* (2006.01)
*B25B 27/02* (2006.01)

(52) U.S. Cl.
CPC .................................... *B25B 27/02* (2013.01)

(58) Field of Classification Search
CPC .. B25B 7/00; B25B 7/12; B25B 27/00; B25B 27/10; B25B 7/20; B25B 21/00
See application file for complete search history.

(56) References Cited

U.S. PATENT DOCUMENTS

| | | | | |
|---|---|---|---|---|
| 3,227,480 | A * | 1/1966 | Hinkle | A22C 25/025 294/902 |
| 4,386,542 | A | 6/1983 | Verna | |
| D334,271 | S * | 3/1993 | Ellis | D99/29 |
| 5,655,806 | A | 8/1997 | Halladay | |
| D426,440 | S * | 6/2000 | Torres | D8/52 |
| D651,881 | S * | 1/2012 | Blockburger | D8/52 |
| 9,409,290 | B1 * | 8/2016 | Gordon | B25J 1/04 |
| 10,328,552 | B2 * | 6/2019 | Forseth | B25B 5/142 |
| 2006/0150786 | A1 | 7/2006 | Whitehead | |
| 2016/0023331 | A1 * | 1/2016 | Chen | B25B 7/12 81/366 |
| 2018/0354111 | A1 | 12/2018 | Getchell | |
| 2019/0358781 | A1 * | 11/2019 | Valento | B25B 7/123 |
| 2022/0040823 | A1 | 2/2022 | Lee | |

FOREIGN PATENT DOCUMENTS

| | | |
|---|---|---|
| WO | WO2021010590 | 1/2021 |

* cited by examiner

*Primary Examiner* — Lee D Wilson

(57) ABSTRACT

A plumbing tool assembly for removing a cartridge housing from a valve body includes a pair of pliers which has of jaws that are urgeable toward or away from each other. A pair of panels is each coupled to a respective one of the pair of jaws of the pliers. A pair of grips is each attached to a respective one of the panels. Each of the grips has a scallop to accommodate a cartridge housing on a valve body of a shower faucet. The scallop in each of the grips is aligned with each other to facilitate the pair of grips to be closed around the cartridge housing for removing the cartridge housing from the valve body.

4 Claims, 6 Drawing Sheets

PLUMBING TOOL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to plumbing devices and more particularly pertains to a new plumbing device for removing a cartridge housing from a valve housing. The device includes a pair of panels each attached to a respective one of pair of jaws of pliers and a pair of grips each attached to a respective one of the panels. Each of the grips has a scallop to accommodate the cartridge housing when the grips are closed around the cartridge housing.

(2) Description of Related Art Including Information Disclosed Under 37 CFR 1.97 and 1.98

The prior art relates to plumbing devices including a pair of pliers with very large gripping surfaces that each has serrations. The prior art discloses a gripping tool that includes a pair of pivotally connected handle members and a pair of semi-circular jaws for gripping a cylindrical inking plug. The prior art discloses a drilling jig assembly that includes a pair of pliers, a pair of panels each attached to respective jaws of the pliers and a plurality of apertures each extending through respective panels for guiding a drill bit.

BRIEF SUMMARY OF THE INVENTION

An embodiment of the disclosure meets the needs presented above by generally comprising a pair of pliers which has of jaws that are urgeable toward or away from each other. A pair of panels is each coupled to a respective one of the pair of jaws of the pliers. A pair of grips is each attached to a respective one of the panels. Each of the grips has a scallop to accommodate a cartridge housing on a valve body of a shower faucet. The scallop in each of the grips is aligned with each other to facilitate the pair of grips to be closed around the cartridge housing for removing the cartridge housing from the valve body.

A further embodiment of the disclosure meets the needs presented above by generally comprising a method of replacing a cartridge in a valve body of a shower faucet which includes the steps of providing a pair of pliers, providing a pair of panels that is each attached to a respective one of the pliers and providing a pair of grips that is each attached to a respective one of the panels. Additionally, each of the grips has a scallop integrated into a respective grip. The method includes the steps of opening the pliers and manipulating the pliers to position the pair of grips around a cartridge housing on the valve body of the shower faucet. Continuing, the method includes the step of closing the pliers thereby facilitating the scallop in each of the grips to accommodate the cartridge housing. The method includes the step of pulling the pliers away from the valve body thereby removing the cartridge housing from the valve body.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
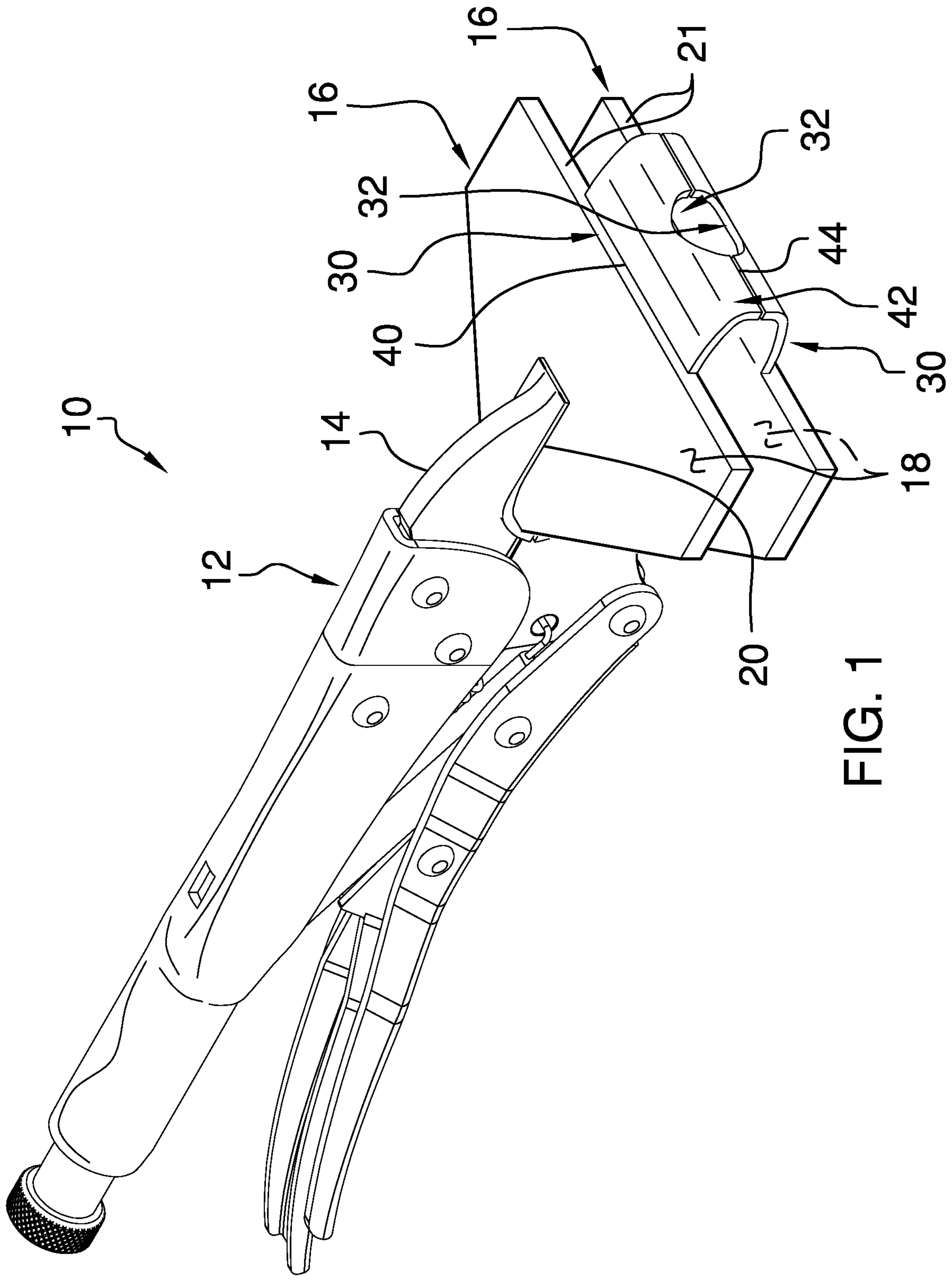
FIG. 1 is a top perspective view of a plumbing tool assembly according to an embodiment of the disclosure.
Figure 2:
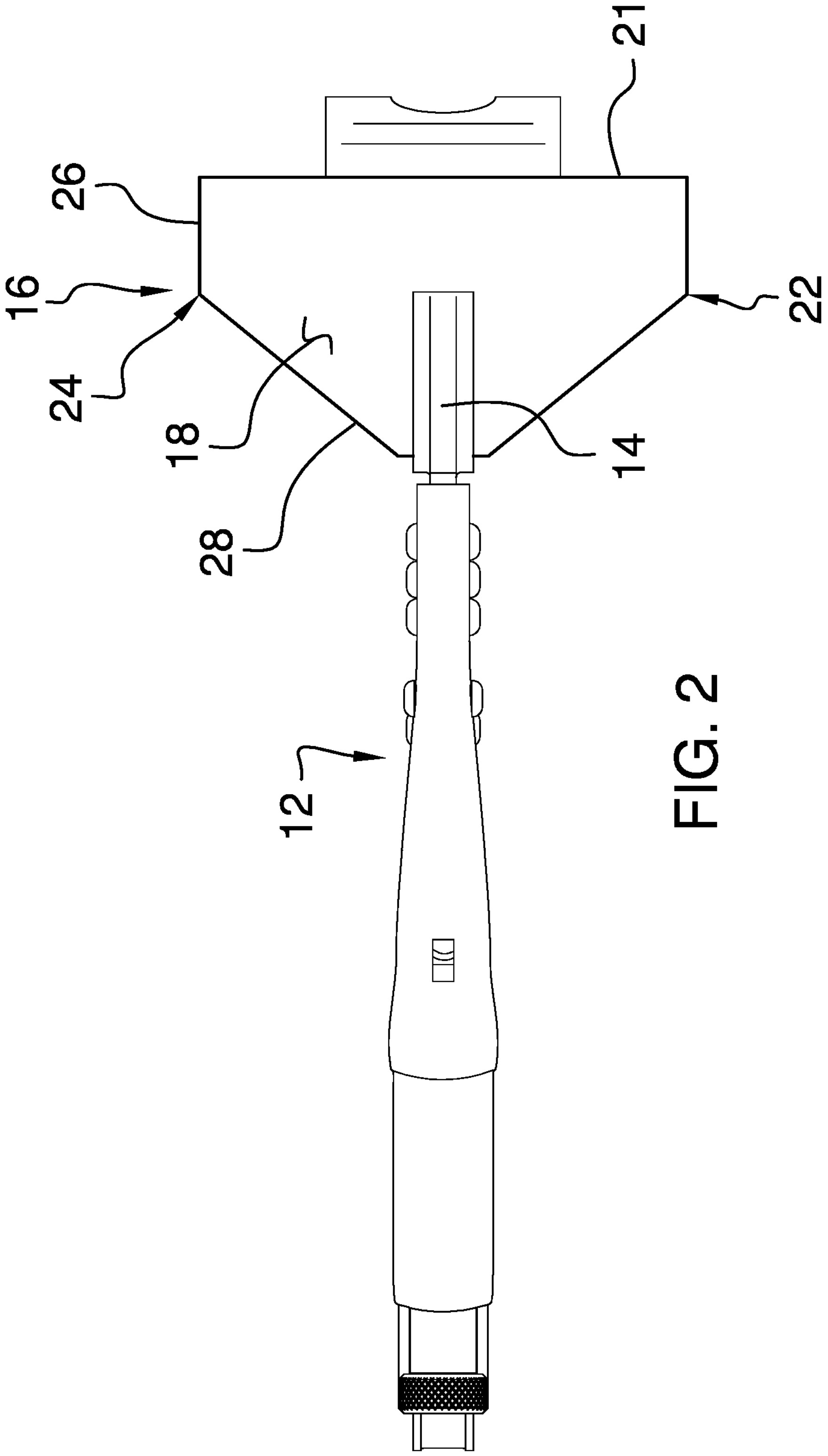
FIG. 2 is a top view of an embodiment of the disclosure.
Figure 3:
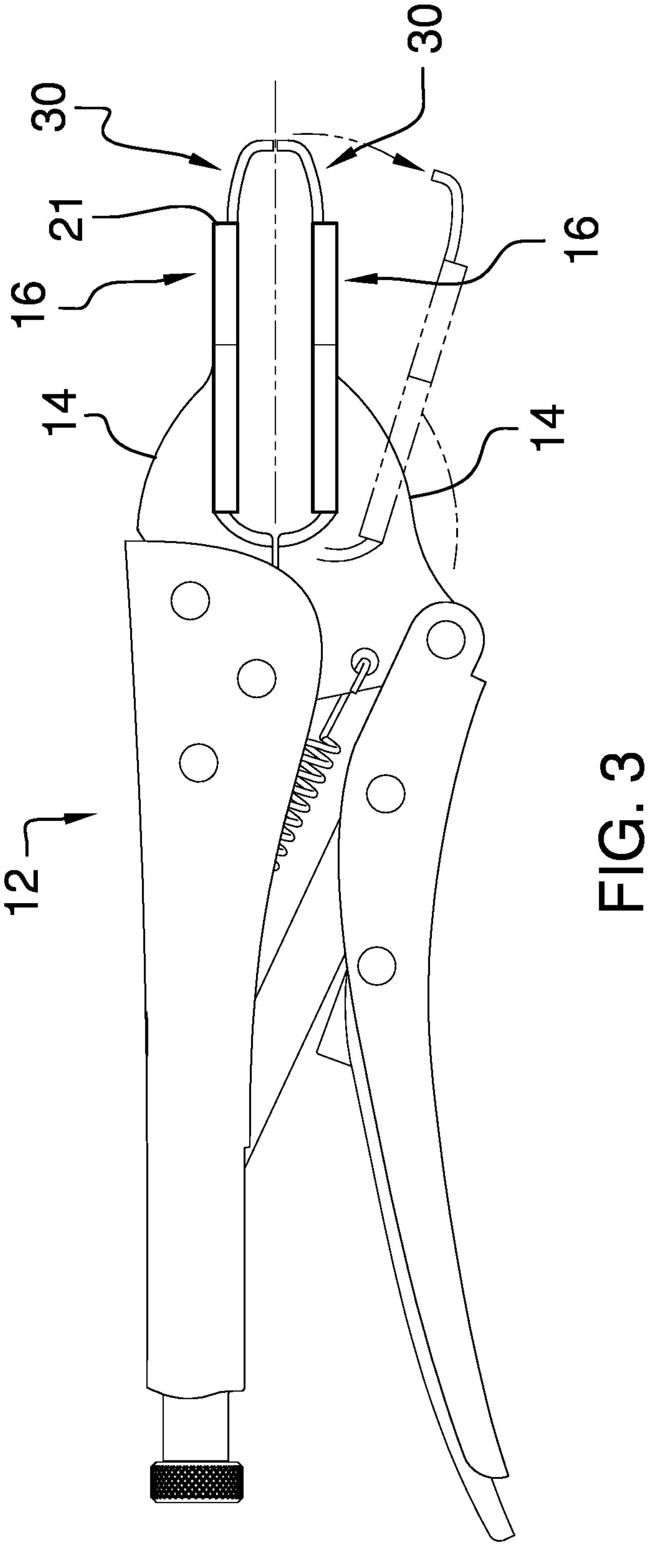
FIG. 3 is a right side view of an embodiment of the disclosure.
Figure 4:
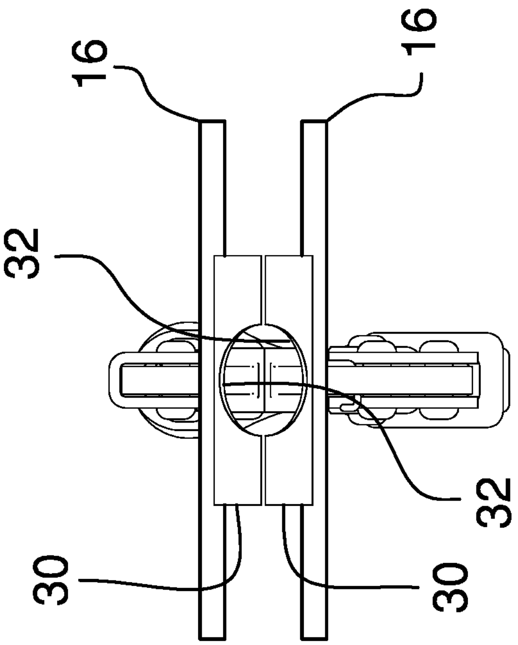
FIG. 4 is a front view of an embodiment of the disclosure.
Figure 5:
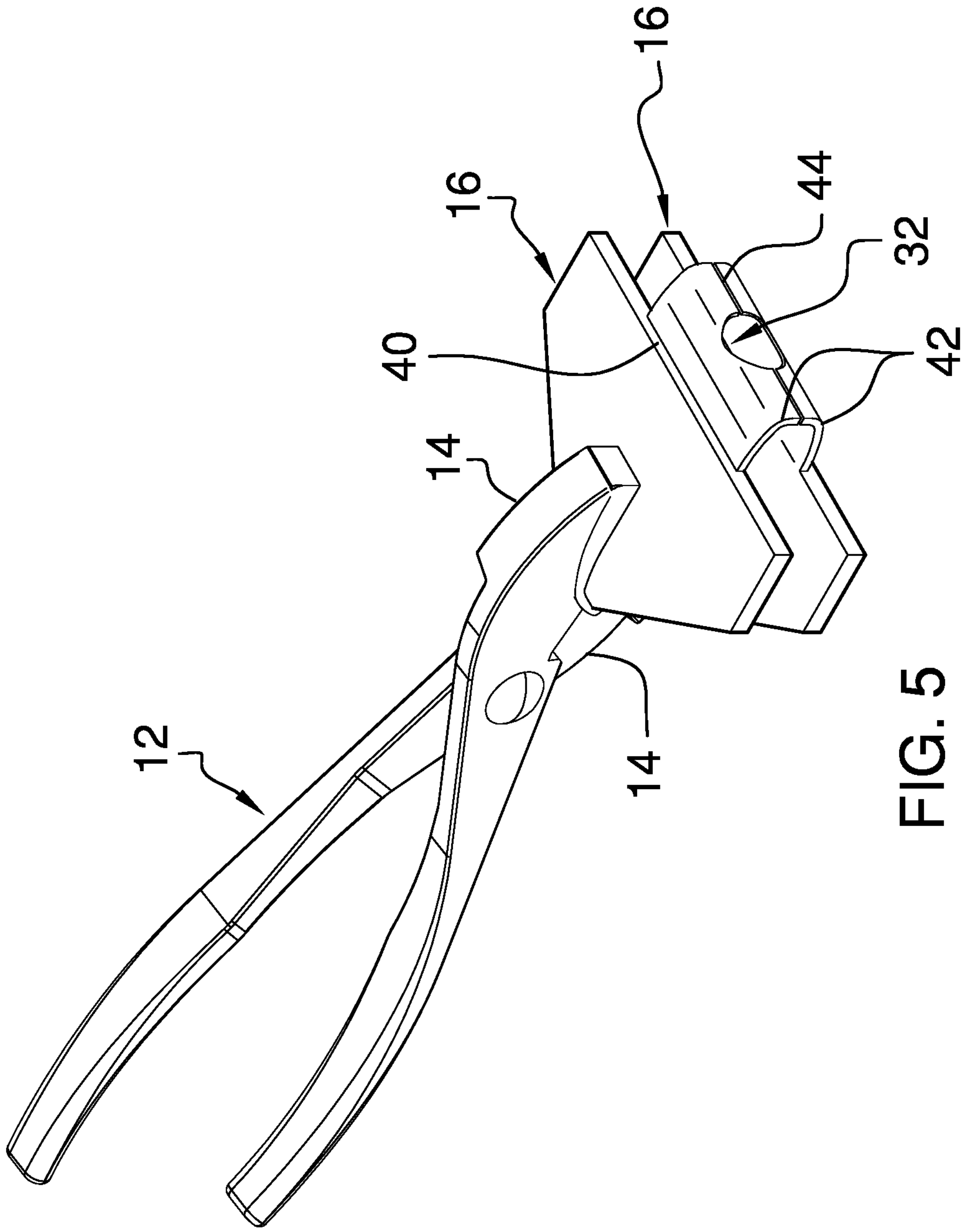
FIG. 5 is a front perspective view of an embodiment of the disclosure.
Figure 6:
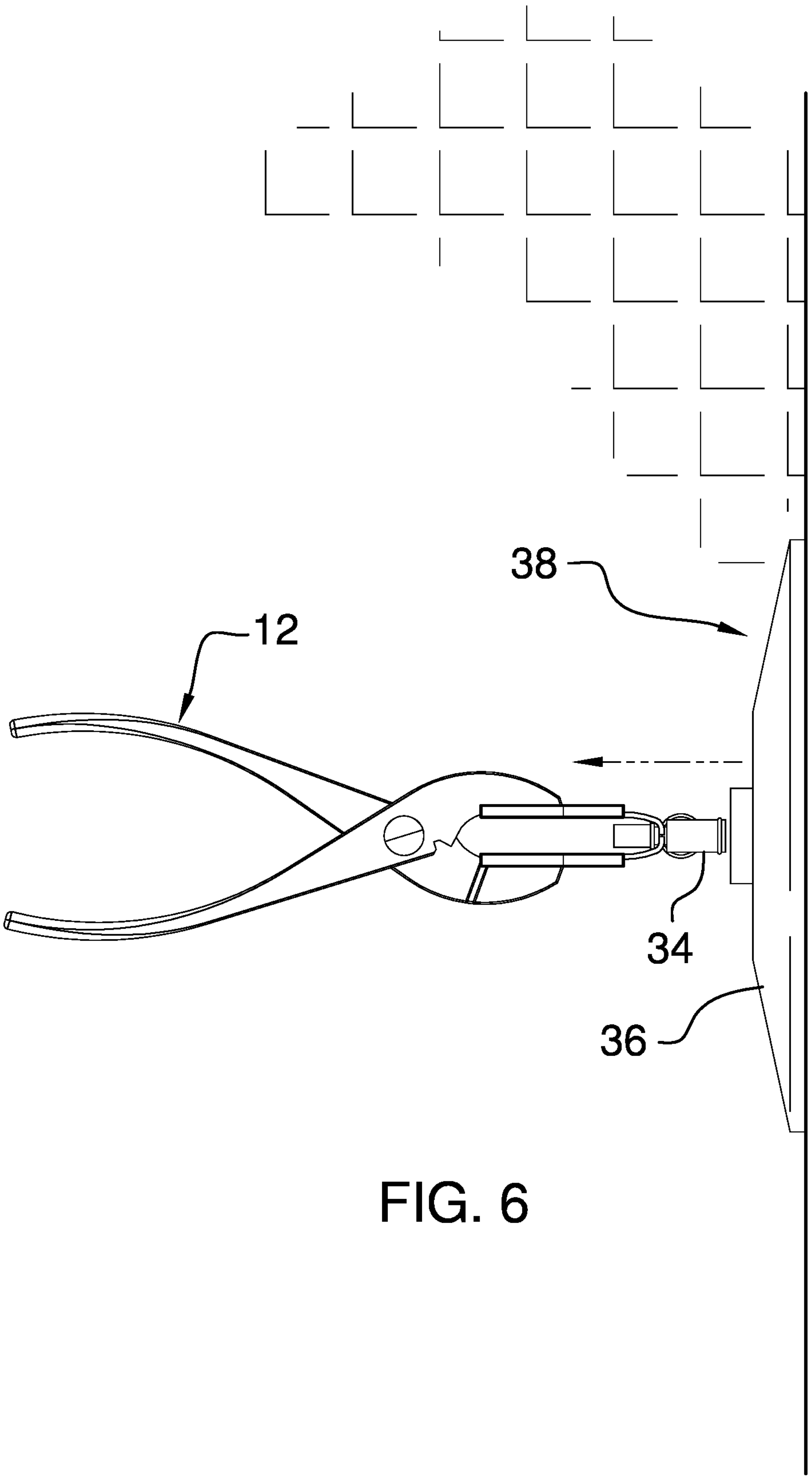
FIG. 6 is a perspective in-use view of an embodiment of the disclosure.

With reference now to the drawings, and in particular to FIGS. 1 through 6 thereof, a new plumbing device embodying the principles and concepts of an embodiment of the disclosure and generally designated by the reference numeral 10 will be described.

As best illustrated in FIGS. 1 through 6, the plumbing tool assembly 10 generally comprises a pair of pliers 12 which has a pair of jaws 14 that is urgeable toward or away from each other. As is most clearly shown in FIGS. 1 through 4, the pliers 12 may comprise locking pliers. As is most clearly shown in FIGS. 5 and 6, the pliers 12 may comprise slip jaw pliers or any other type of pliers that are commonly employed as hand tools. A pair of panels 16 is each coupled to a respective one of the pair of jaws 14 of the pliers 12.

Each of the pair of panels 16 is urged toward or away from each other when the jaws 14 are urged toward or away from each other. Each of the panels 16 has a first surface 18 that is bonded to a gripping surface 20 of the respective jaw 14 having a front edge 21 of each of the panels 16 being aligned with each other. Each of the panels 16 has first lateral edge 22 and a second lateral edge 24; each of the first lateral edge 22 and second lateral edge 24 has a straight portion 26 intersecting the front edge 21 at a perpendicular angle and an angled portion 28 angling inwardly between the straight portion 26 and the respective jaw 14 such that each of the panels 16 has a pentagonal shape.

A pair of grips 30 is provided and each of the grips 30 is attached to a respective one of the panels 16. Each of the grips 30 has a scallop 32 to accommodate a cartridge housing 34 on a valve body 36 of a shower faucet 38. The scallop 32 in each of the grips 30 is aligned with each other to facilitate the pair of grips 30 to be closed around the cartridge housing 34 for removing the cartridge housing 34 from the valve body 36. Each of the grips 30 has a rear edge 40 that is coupled to the front edge 21 of the respective panel 16. Additionally, each of the grips 30 has a bend 42 that is positioned between the rear edge 40 and a forward edge 44 of the grips 30 such that the forward edge 44 of each of the pair of grips 30 is directed toward each other.

The scallop 32 in each of the pair of grips 30 extends from the forward edge 44 toward the bend 42. Additionally, the scallop 32 in each of the grips 30 is centrally positioned on the forward edge 44. The forward edge 44 of each of the grips 30 abuts each other having the scallop 32 in each of the grips 30 forming a circle when the pliers 12 are closed. In this way the pair of grips 30 can grip the cartridge housing 34 for subsequently removing the cartridge housing 34 from the valve body 36. The shower faucet 38 may be a Delta 1300 series or a Delta 1400 series manufactured by Delta Faucet Company, 55 East 111$^{th}$ Street, Indianapolis, Indiana, 46280.

In use, the grips 30 on the pliers 12 are closed around the cartridge housing 34 in the valve body 36. In this way the cartridge housing 34 can be firmly gripped by the grips 30 for pulling the cartridge housing 34 out of the valve body 36. Thus, the cartridge 46 in the valve body 36 can be replaced when the cartridge 46 ceases to function properly. The cartridge housing 34 is typically difficult or impossible to grip by hand to facilitate the cartridge housing 34 to be removed from the valve body 36. Often times this leads to the valve body 36 needing to be replaced when the cartridge 46 ceases to function properly, which can lead to expensive labor costs associated with a plumber. Thus, the pliers 12 and grips 30 can help avoid the labor expense associated with replacing the valve body 36.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A plumbing tool assembly for removing a cartridge housing from a valve body of a shower faucet, said assembly comprising:

a pair of pliers, said pair of pliers having a pair of jaws being urgeable toward or away from each other;

a pair of panels, each of said pair of panels being coupled to a respective one of said pair of jaws of said pair of pliers, each of said pair of panels being urged toward or away from each other when said jaws are urged toward or away from each other;

a pair of grips, each of said grips being attached to a respective one of said panels, each of said grips having a scallop wherein said scallop in each of said pair of grips is configured to accommodate a cartridge housing on a valve body of a shower faucet, said scallop in each of said grips being aligned with each other wherein said scallop in each of said pair of grips is configured to facilitate said pair of grips to be closed around the cartridge housing for removing the cartridge housing from the valve body; and wherein each of said panels has a first surface being bonded to a gripping surface of said respective jaw having a front edge of each of said panels being aligned with each other, each of said panels having first lateral edge and a second lateral edge, of said first lateral edge and second lateral edge having a straight portion intersecting said front edge at a perpendicular angle and an angled portion angling inwardly between said straight portion and said jaw such that each of said panels has a pentagonal shape.

2. The assembly according to claim 1, wherein each of said grips has a rear edge being coupled to said front edge of said respective panel, each of said grips having a bend being positioned between said rear edge and a forward edge of said grips such that said forward edge of each of said pair of grips is directed toward each other, said scallop in each of said pair of grips extending from said forward edge toward said bend.

3. The assembly according to claim 1, wherein each of said pair of grips has a forward edge, said scallop in each of said grips being centrally positioned on said forward edge, said forward edge of each of said grips abutting each other having said scallop in each of said grips forming a circle when said pliers are closed wherein said pair of grips is configured to grip the cartridge housing.

4. A plumbing tool assembly for removing a cartridge housing from a valve body of a shower faucet, said assembly comprising:

a pair of pliers, said pair of pliers having a pair of jaws being urgeable toward or away from each other;

a pair of panels, each of said pair of panels being coupled to a respective one of said pair of jaws of said pair of pliers, each of said pair of panels being urged toward or away from each other when said jaws are urged toward or away from each other, each of said panels having a first surface being bonded to a gripping surface of said respective jaw having a front edge of each of said panels being aligned with each other, each of said panels having first lateral edge and a second lateral edge, of said first lateral edge and second lateral edge having a straight portion intersecting said front edge at a perpendicular angle and an angled portion angling inwardly between said straight portion and said jaw such that each of said panels has a pentagonal shape; and a pair of grips, each of said grips being attached to a respective one of said panels, each of said grips having a scallop wherein said scallop in each of said pair of grips is configured to accommodate a cartridge housing on a valve body of a shower faucet, said scallop in each of said grips being aligned with each other wherein said scallop in each of said pair of grips is configured to facilitate said pair of grips to be closed around the cartridge housing for removing the cartridge housing from the valve body, each of said grips having a rear edge being coupled to said front edge of said respective panel, each of said grips having a bend being positioned between said rear edge and a forward edge of said grips such that said forward edge of each of said pair of grips is directed toward each other, said scallop in each of said pair of grips extending from said forward edge toward said bend, said scallop in each of said grips being centrally positioned on said forward edge, said forward edge of each of said grips abutting each other having said scallop in each of said grips forming a circle when said pliers are closed wherein said pair of grips is configured to grip the cartridge housing.

* * * * *